(12) United States Patent
Lee (10) Patent No.: US 6,883,040 B2
(45) Date of Patent: Apr. 19, 2005

(54) MULTI-FUNCTION APPARATUS AND METHOD FOR RECEIVING AND PRINTING ELECTRONIC LETTER

(75) Inventor: Hyun-jun Lee, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 09/881,767

(22) Filed: Jun. 18, 2001

(65) Prior Publication Data

US 2002/0091878 A1 Jul. 11, 2002

(30) Foreign Application Priority Data

Jan. 11, 2001 (KR) .......................................... 2001-1547

(51) Int. Cl.$^7$ ............................................... G06F 3/00
(52) U.S. Cl. ................................. 710/15; 710/5; 710/8
(58) Field of Search ............................... 710/1, 5, 8, 9, 710/15, 16

(56) References Cited

U.S. PATENT DOCUMENTS

| | | | | |
|---|---|---|---|---|
| 5,521,719 | A | * | 5/1996 | Yamada |
| 6,052,442 | A | * | 4/2000 | Cooper et al. |
| 6,094,277 | A | * | 7/2000 | Toyoda |
| 6,229,884 | B1 | * | 5/2001 | Toyoda et al. |

FOREIGN PATENT DOCUMENTS

GB 2347053 * 8/2000 ........... G06F/17/60

OTHER PUBLICATIONS www.webopedia.com searched terms: console, password.*
www.howstuffworks.com searched terms USB, parallel port, EPROM, flash memory.*
www.apc.com: APC.*
Gordon, Padwick: Using Microsoft Outlook 2000, Que, 1999, eBook ISBN: 0585213704.*

* cited by examiner

Primary Examiner—Jeffrey Gaffin
Assistant Examiner—Alan S Chen
(74) Attorney, Agent, or Firm—Robert E. Bushnell, Esq.

(57) ABSTRACT

A multi-function apparatus and method for receiving and printing an electronic letter is provided for a plurality of users. An electronic letter receiver converts received data from a mail server into image and character data and outputs the image and character data. A letter storing unit sorts and stores the image and character data by the users' accounts. A display unit displays information extracted from the image and character data. A user interface unit outputs a display requesting signal when an authorized user requests to view letters for the user and outputs an account control signal having information selected by the authorized user from the displayed information. A controller stores the image and character data received from the electronic letter receiver in the letter storing unit, outputs the stored image and character data to the display unit in response to the display requesting signal, reads image and character data, which is selected from among the stored image and character data based on the account control signal, from the letter storing unit, and outputs the read image and character data together with a printing control signal. A printer prints letters corresponding to the data selectively read by the controller, in response to the printing control signal.

28 Claims, 7 Drawing Sheets

MULTI-FUNCTION APPARATUS AND METHOD FOR RECEIVING AND PRINTING ELECTRONIC LETTER

CLAIM OF PRIORITY

This application makes reference to, incorporates the same herein, and claims all benefits accruing under 35 U.S.C. §119 from an application for MULTI-FUNCTION APPARATUS AND METHOD FOR RECEIVING AND PRINTING ELECTRONIC LETTER earlier filed in the Korean Industrial Property Office on Jan. 11, 2001 and there duly assigned Serial No. 2001-1547.

BACKGROUND OF THE INVENTION

1. Field of the Invention

The present invention relates to a process of an electronic letter which is transferred by electronic mail (e-mail), and more particularly, to a multi-function apparatus and method for receiving and printing an electronic letter.

2. Description of the Background Art

As the Internet industry is rapidly spread, a variety of techniques and products associated with the Internet have considerably increased for the last several years. An electronic letter receiving and printing multi-function apparatus is such a product associated with the Internet.

The electronic letter receiving and printing multi-function apparatus receives an electronic letter, which is transferred by e-mail over the Internet, and automatically prints the received electronic letter. An e-mail printer or an Internet multi-function apparatus is such an electronic letter receiving and printing multi-function apparatus. Here, the e-mail printer is different from the Internet multi-function apparatus in that the operation of the e-mail printer is not associated with a personal computer while the Internet multi-function apparatus is associated with a personal computer or the like.

An earlier electronic letter receiving and printing multi-function apparatus accesses the server of an Internet service provider (ISP) at regular time intervals and logs into the accessed server with accounts which have been previously registered in the accessed server. When there is a letter transferred by e-mail to the address of any account with which the apparatus logs into the server, the apparatus receives and prints the electronic letter. According to such an electronic letter receiving and printing multi-function apparatus, e-mail letters are received and automatically printed at regular time intervals. Here, an earlier electronic letter receiving and printing multi-function apparatus which is used by a plurality of users sequentially logs in to an ISP server with a plurality of accounts, which have been previously registered in the ISP server which has been accessed, at regular time intervals and receives and prints all letters addressed to the accounts.

Such an earlier electronic letter receiving and printing multi-function apparatus continuously prints all letters, which are sequentially received, like a general facsimile machine. Consequently, the letters for different users are mixed so that it is difficult to intentionally manage the letters. In addition, when a letter addressed to a certain user is not supposed to be opened to the public in terms of business, personal reasons or security, the security of the letter cannot be preserved. Moreover, since every letter received from a server is automatically printed, letters which do not need to be printed are printed resulting in a waste of printing paper.

SUMMARY OF THE INVENTION

It is therefore an object of the present invention to provide an electronic letter receiving and printing multi-function apparatus which can be commonly used by a plurality of users and selectively print letters that are addressed to a user requesting the print of the letters among letters transferred by electronic mail (e-mail).

It is another object of the present invention to provide a multi-function method of receiving and printing an electronic letter, which can be commonly used by a plurality of users and selectively print letters that are addressed to a user requesting the print of the letters among letters transferred by e-mail.

It is still yet another object to have an electronic mail receiving and printing apparatus that reduces manufacturing costs by having the electronic mail letters be stored using a built-in memory within a personal computer without a separate memory.

It is another object to have an electronic mail receiving and printing apparatus that can output the received mail and yet maintain privacy and security of a user.

Accordingly, to achieve the objectives of the invention, there is provided an apparatus for receiving each letter for a plurality of users, which is transferred by electronic mail to a mail server which has a unique address on a network and performs a mail service function, from the mail server and printing the letter. The apparatus includes an electronic letter receiver for converting receiving data corresponding to each letter received from the server into image and character data and outputting the image and character data; a letter storing unit for sorting and storing the image and character data by the users' accounts; a display unit for displaying information extracted from the image and character data; a user interface unit for outputting a display requesting signal when an authorized user requests to view a letter or letters addressed to himself or herself and outputting an account control signal having information selected by the authorized user from the displayed information; a controller for storing the image and character data received from the electronic letter receiver in the letter storing unit, outputting the stored image and character data to the display unit in response to the display requesting signal, reading image and character data, which is selected from among the stored image and character data based on the account control signal, from the letter storing unit, and outputting the read image and character data together with a printing control signal, and a printer for printing a letter or letters corresponding to the image and character data selectively read by the controller, in response to the printing control signal.

Further, there is provided a method of receiving each letter for a plurality of users, which transferred by electronic mail to a mail server that has a unique address on a network and performs a mail service function, from the mail server and printing the letter. The method includes the steps of converting receiving data corresponding to each letter received from the server into image and character data, and sorting and storing the image and character data by the users' accounts; continuously determining whether an authorized user request to view letters addressed to himself or herself; displaying information extracted from the stored image and character data when the authorized user requests to view the letters addressed to himself or herself; determining information selected by the authorized user from the displayed information; and reading image and character data corresponding to the selected information among the stored image and character data.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
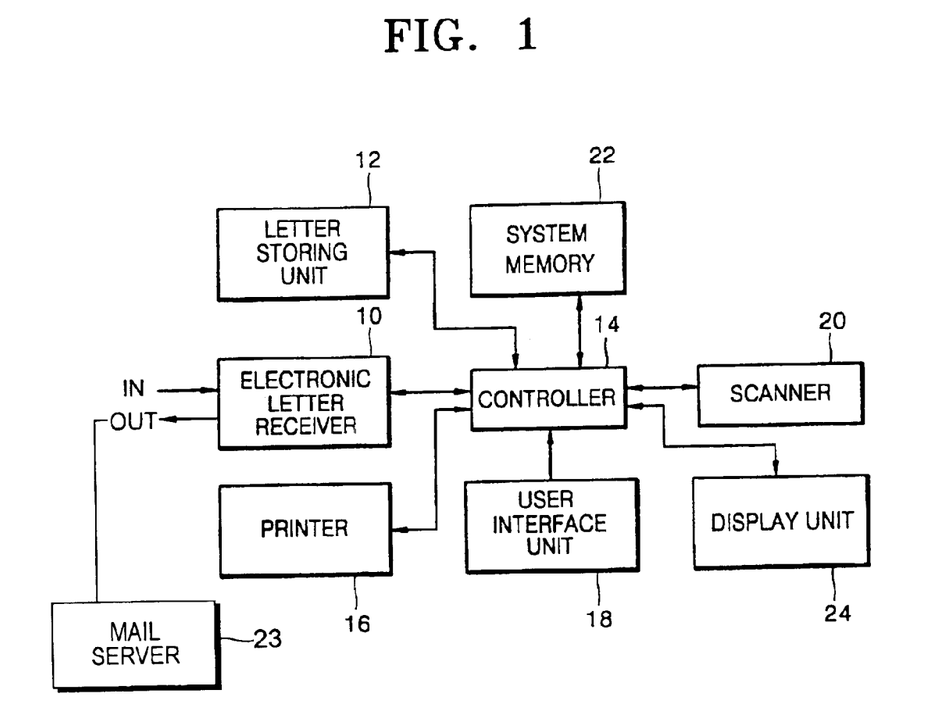
FIG. 1 is a block diagram illustrating an embodiment of an electronic letter receiving and printing multi-function apparatus according to the present invention.

Turning now to the drawings, as seen in FIG. 1, the electronic letter receiving and printing multi-function apparatus includes an electronic letter receiver 10, a letter storing unit 12, a controller 14, a printer 16, a user interface unit 18 and a display unit 24. A scanner 20 and a system memory 22 can be further provided. The electronic letter receiving and printing multi-function apparatus of FIG. 1 is similar to the electronic mail (e-mail) printer described above in that the apparatus receives and prints a letter transferred by e-mail (referred to as an electronic letter) without being linked to a personal computer.

The electronic letter receiver 10 receives an electronic letter or a plurality of electronic letters through an input terminal IN, converts receiving data corresponding to each of the received electronic letters into image and character data and outputs the image and character data to the controller 14. Here, the electronic letter or the plurality of electronic letters received through the input terminal IN has been transferred to a mail server 23 which has a unique address on a network and performs a mail service function. The controller 14 outputs signals, which are necessary for accessing the mail server and logging into the mail server with an account, to the mail server through an output terminal OUT via the electronic letter receiver 10. The mail server may be the server of an Internet service provider (ISP). According to this embodiment of the present invention, the electronic letter receiver 10 can be realized as a modem. In this case, the modem converts image or character data into transmission data or data externally received into image or character data under the control of the controller 14 for facsimile transmission of image data processed by the scanner 20, transmission or reception of data necessary for Internet access and transmission or reception of an electronic letter.

Under the control of the controller 14, the letter storing unit 12 sorts and stores the image and character data, into which the electronic letter receiver 10 converts the received electronic letters, by the accounts of a plurality of users. For this, the letter storing unit 12 is divided into a plurality of areas so that image and character data corresponding to an electronic letter addressed to a certain user can be stored at an area assigned to the user. In addition, the letter storing unit 12 may have a backup function for preparing against a power failure.

The display unit 24 displays information extracted from the image and character data received from the controller 14 to a user (referred to as an authorized user) who has the authority to view the information. The displayed information may include the total number of users, that is, the total number of registered accounts, the total number of electronic letters addressed to each account and the subjects of the letters.

The user interface unit 18 outputs a display requesting signal to the controller 14 when the authorized user requests to view electronic letters addressed to oneself (the authorized user). For this, the user interface unit 18 may be realized as a keypad (or a mouse) so that the display requesting signal can be generated only when the authorized user inputs a valid password by manipulating keys (not shown) on the keypad. In addition, the user interface unit 18 outputs an account control signal, which has information selected by the authorized user among the displayed information, to the controller 14. The user interface unit 18 may be designed such that it generates the account control signal only when the user inputs a valid password, in order to prevent other users, who do not have the authority to view an electronic letter, from viewing or printing the electronic letter or letters.

The controller 14 stores the image and character data received from the electronic letter receiver 10 in the letter storing unit 12 and outputs all image and character data stored in the letter storing unit 12 to the display unit 24 in response to the display requesting signal output from the user interface unit 18. Therefore, the user can view the electronic letter or letters through the display unit 24. In addition, the controller 14 outputs image and character data, which is selectively read in response to the account control signal received from the user interface unit 18 among the image and character data stored in the letter storing unit 12, to the printer 16 together with a printing control signal. For example, once an authorized user selects an account, to which an electronic letter or electronic letters desired to be printed among the letters addressed to the plurality of accounts and displayed through the display unit 18 are addressed, and the subject or subjects of the electronic letter or letters by manipulating the user interface unit 18, e.g., the keys described above, the user interface unit 18 outputs the result of the manipulation as the account control signal to the controller 14. The controller 14 selects image and character data corresponding to the account and the electronic letters, which are selected by the user, in response to the account control signal and outputs the selected image and character data to the printer 16. The printer 16 prints the letter or letters corresponding to the image and character data, which is selectively read by the controller 14 in response to the account control signal, in response to the printing control signal received from the controller 14.

Meanwhile, the electronic letter receiving and printing multi-function apparatus of FIG. 1 according to the present invention may additionally have the scanner 20. The scanner 20 may include an image processor (not shown) for performing on image data received from a built-in image sensor (not shown) shading and gamma correction, dot-per-inch (dpi) conversion, edge emphasis, error diffusion and the like, and a manuscript recognizing sensor (not shown) for recognizing a manuscript. The scanner 20 for scanning image and processing scanned image data is controlled by the controller 14. The system memory 22 stores a system program and can be realized as a flash memory such as an erasable programmable read only memory (EPROM). Accordingly, the controller 14 of FIG. 1 can control the printer 16, the letter storing unit 12, the display unit 24 and the scanner 20 by performing the system program stored in the system memory 22.

In the case that an electronic letter receiving and printing multi-function apparatus according to the present invention operates in association with a personal computer, the letter storing unit 12 of FIG. 1 may correspond to a memory within the personal computer.

The following description concerns the configuration and operation of another embodiment of such an electronic letter receiving and printing multi-function apparatus according to the present invention.

Figure 2:
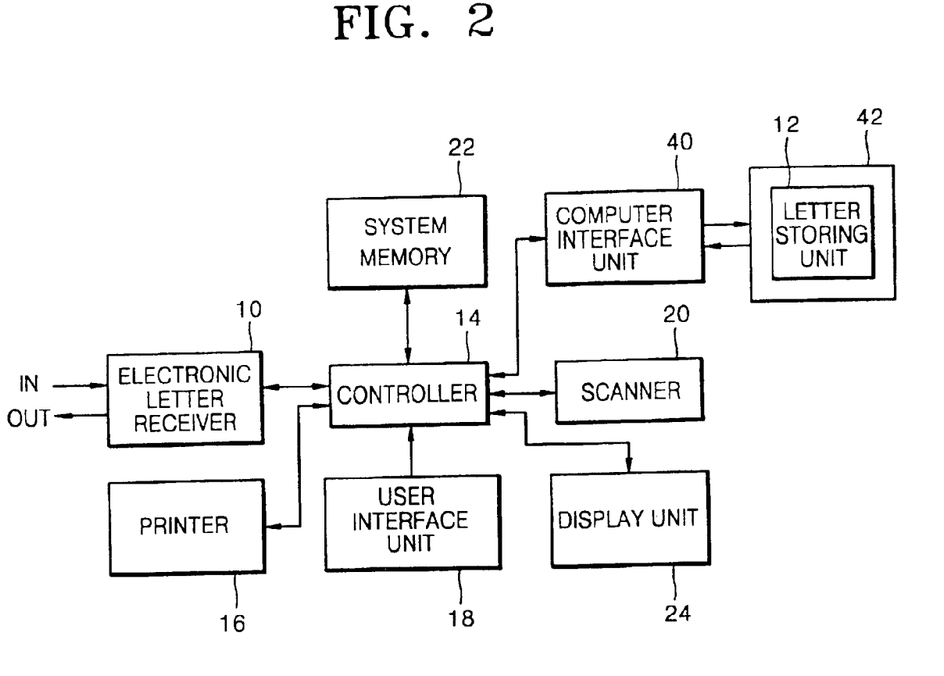
FIG. 2 is a block diagram illustrating another embodiment of an electronic letter receiving and printing multi-function apparatus according to the present invention.

FIG. 2 is a block diagram illustrating another embodiment of an electronic letter receiving and printing multi-function apparatus according to the present invention. The electronic letter receiving and printing multi-function apparatus includes an electronic letter receiver 10, a letter storing unit 12, a controller 14, a printer 16, a user interface unit 18, a display unit 24 and a computer interface unit 40. A scanner 20 and a system memory 22 can be further provided. The electronic letter receiving and printing multi-function apparatus of FIG. 2 is similar to the Internet multi-function apparatus described before in that the electronic letter receiving and printing multi-function apparatus receives electronic letters in association with a personal computer.

The configuration and operation of the electronic letter receiving and printing multi-function apparatus of FIG. 2 are the same as those of the apparatus of FIG. 1 with the exception that the letter storing unit 12 of FIG. 2 is included in a personal computer 42, image and character data stored in the letter storing unit 12 is input to the controller 14 via the computer interface unit 40, and image and character data generated by the electronic letter receiver I 0 is stored in the letter storing unit 12 via the controller 14 and the computer interface unit 40. Thus, a detailed description of each member of the apparatus of FIG. 2 will be omitted.

The computer interface unit 40 of FIG. 2 interfaces the personal computer 42 with the electronic letter receiving and printing multi-function apparatus through a parallel port (or a universal serial bus (USB)). For example, the computer interface unit 40 receives data, which is scanned by the scanner 20, and an electronic letter which is received by the electronic letter receiver 10 via the controller 14 and transmits the data and the electronic letters to the personal computer 42. In addition, the computer interface unit 40 receives data to be printed and a letter composed at the personal computer 42 and outputs them to the printer 16 via the controller 14. Therefore, the printer 16 of FIG. 2 can copy and print data received from the personal computer 42 via the computer interface unit 40 and the controller 14.

Figure 3:
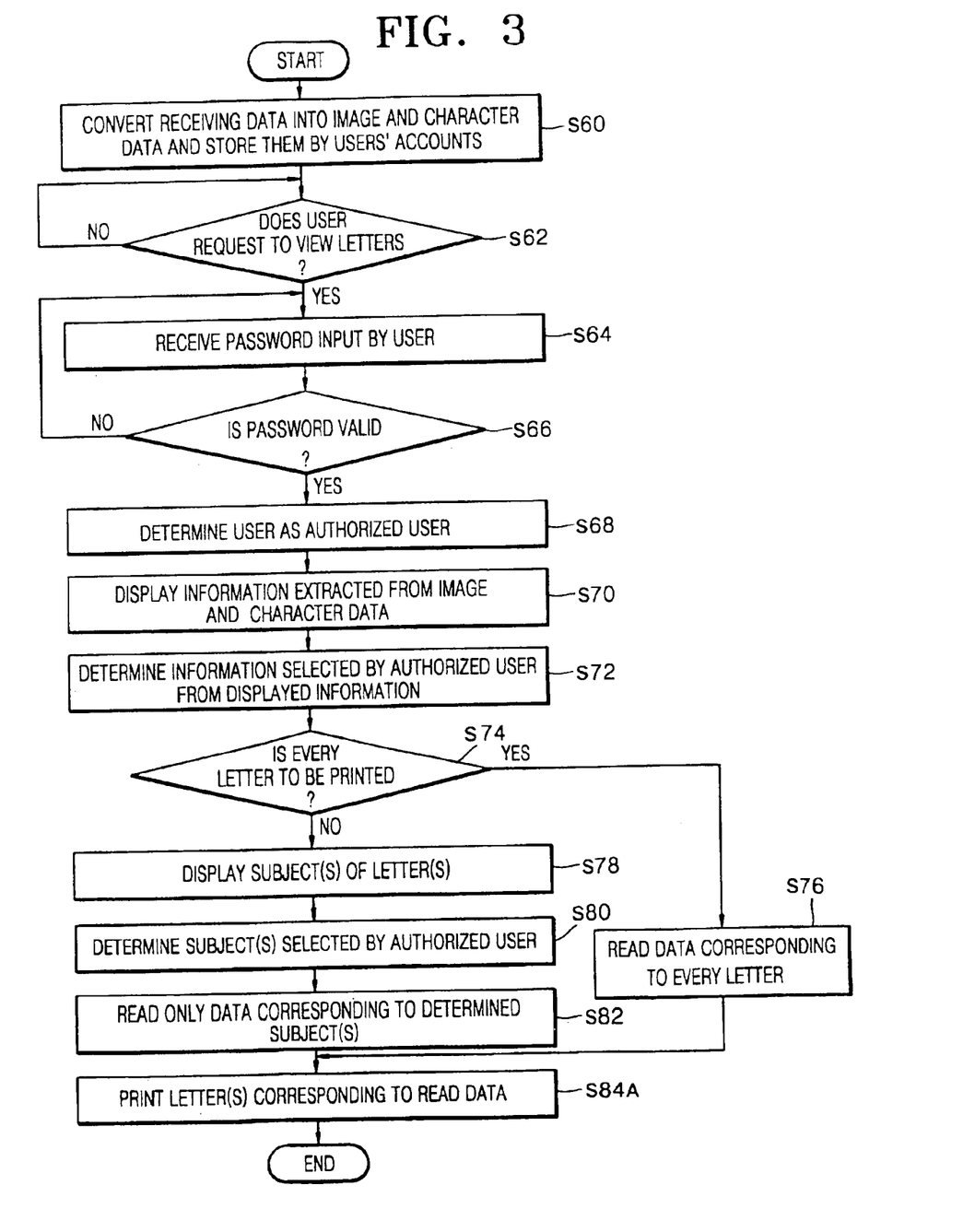
FIG. 3 is a flowchart illustrating a multi-function method of receiving and printing an electronic letter according to the present invention.

Hereinafter, a multi-function method of receiving and printing an electronic letter performed by an electronic letter receiving and printing multi-function apparatus as shown in FIG. 1 or 2 according to the present invention will be described with reference to the attached drawings. FIG. 3 is a flowchart illustrating a multi-function method of receiving and printing an electronic letter performed by the apparatus of FIG. 1 or 2 according to the present invention. The multi function method includes a step S60 of converting receiving data into image and character data and storing the converted data by accounts, steps S62 through S72 for displaying electronic letters to an authorized user and allowing the authorized user to select desired information and steps S74 through S84A for reading electronic letters corresponding to the selected information and displaying the read electronic letters to the authorized user or printing them.

In the step S60, the electronic letter receiver 10 converts receiving data corresponding to electronic letters which are received from a server through the input terminal IN into image and character data, and the controller 14 sorts the image and character data by users' accounts and stores the sorted data in the letter storing unit 12 of FIG. 1 or 2. In other words, the image and character data is sorted by the accounts and stored in the separate letter storing unit 12 of FIG. 1 or the letter storing unit 12 within the personal computer 42 of FIG. 2. The following description concerns a preferred embodiment of the step S60 according to the present invention.

Figure 4:
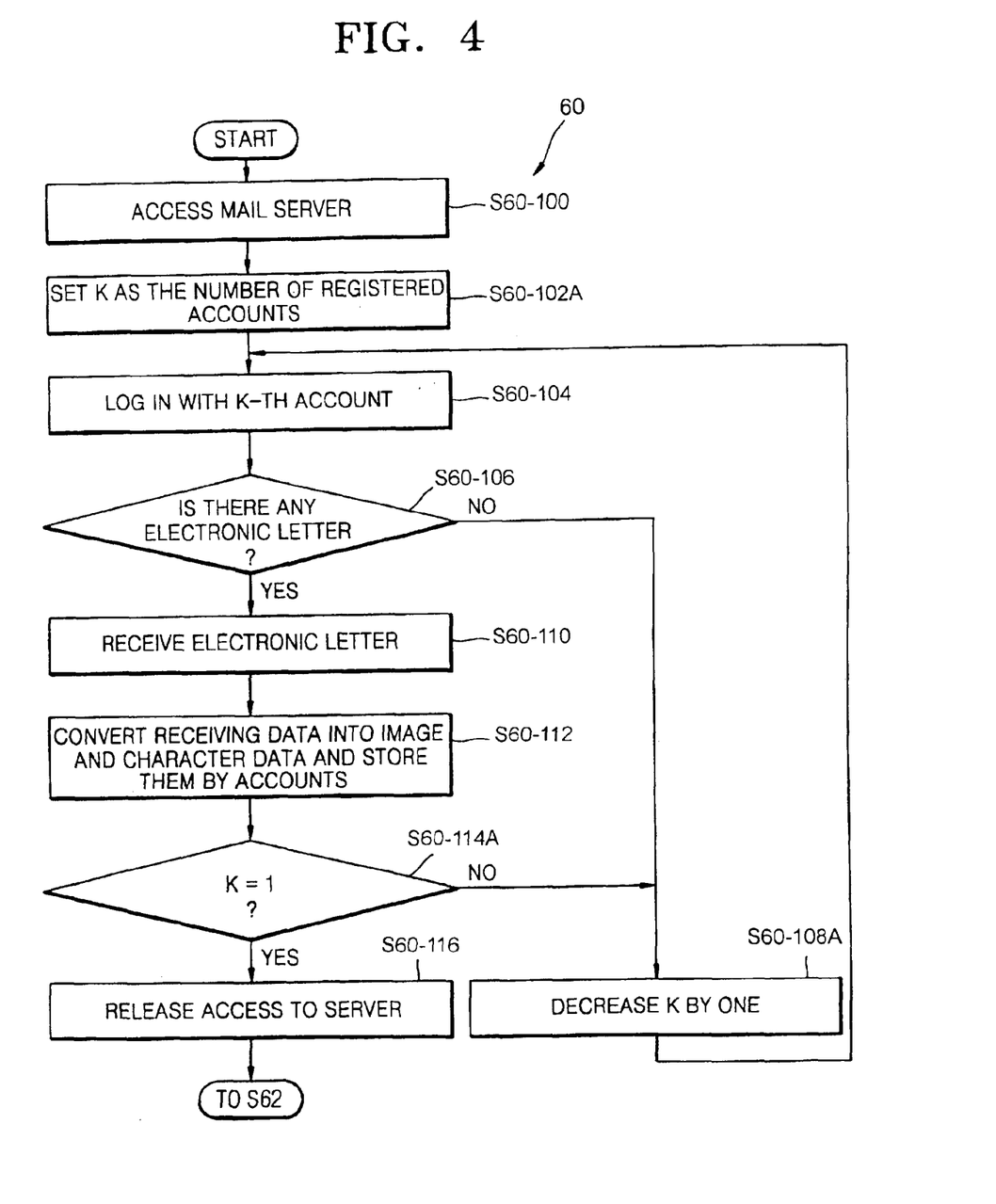
FIGS. 4 and 5 are flowcharts illustrating preferred embodiments of the step S60 of FIG. 3 according to the present invention.

FIG. 4 is a flowchart illustrating a preferred embodiment of the step S60 in which the apparatus of FIG. 1 or 2 receives letters from a server and stores them. The step S60 includes sub steps S60–100 through S60–116 for storing data by accounts, which corresponds to electronic letters received by accounts.

In the step S60–100, the electronic letter receiving and printing multi-function apparatus of FIG. 1 or 2 accesses a mail server. More specifically, the controller 14 accesses the mail server by transmitting access signals for checking whether the mail server is on, whether the mail server can provide a mail service function and so on to the mail server via the electronic letter receiver 10 and the output terminal OUT. Thereafter, in the step S60–102A, the controller 14 sets K ($1 \leq K \leq$ the number of registered accounts) as the number of registered accounts. Then, in the step S60–104, the controller 14 logs into the accessed mail server with a K-th registered account. More specifically, the controller 14 outputs the name and the password of the K-th registered account to the mail server 23 via the electronic letter receiver 10 and the output terminal OUT to log into the mail server with the K-th registered account. Thereafter, in the step S60–106, the controller 14 determines whether there is any electronic letter addressed to the K-th registered account.

If there are no electronic letters addressed to the K-th registered account, in the step S60–108A, the controller 14 decreases K by one. Then, the step S60–104 is performed. That is, the controller 14 repeatedly performs the steps S60–104 through S60–108A to check whether there is any electronic letter addressed to the next registered account. Alternatively, if there is at least one letter addressed to the K-th registered account, in the step S60–110, the controller 14 controls the electronic letter receiver 10 of the FIG. 1 or 2 to receive all electronic letters addressed to the K-th registered account from the mail server. Thereafter, in the step S60–112, receiving data corresponding to the received electronic letters is converted into image and character data, sorted by accounts and stored in the letter storing unit 12 of FIG. 1 or 2 in the order in which the electronic letters are received.

Thereafter, in the step S60–114A, the controller 14 determines whether K is "1". If K is not "1", the step S60–108A is performed so that another account is checked to determine whether there is any electronic letter addressed to the current account. If K is "1", that is, if all the registered accounts are checked, the controller 14 releases the access to the mail server in the step S60–116.

The step S60 of FIG. 4 can be performed at regular time intervals, for example, two times per day or every two hours, so that electronic letter(s) addressed to each of the accounts registered in the mail server can be stored in the letter storing unit 12 by the accounts.

Figure 5:
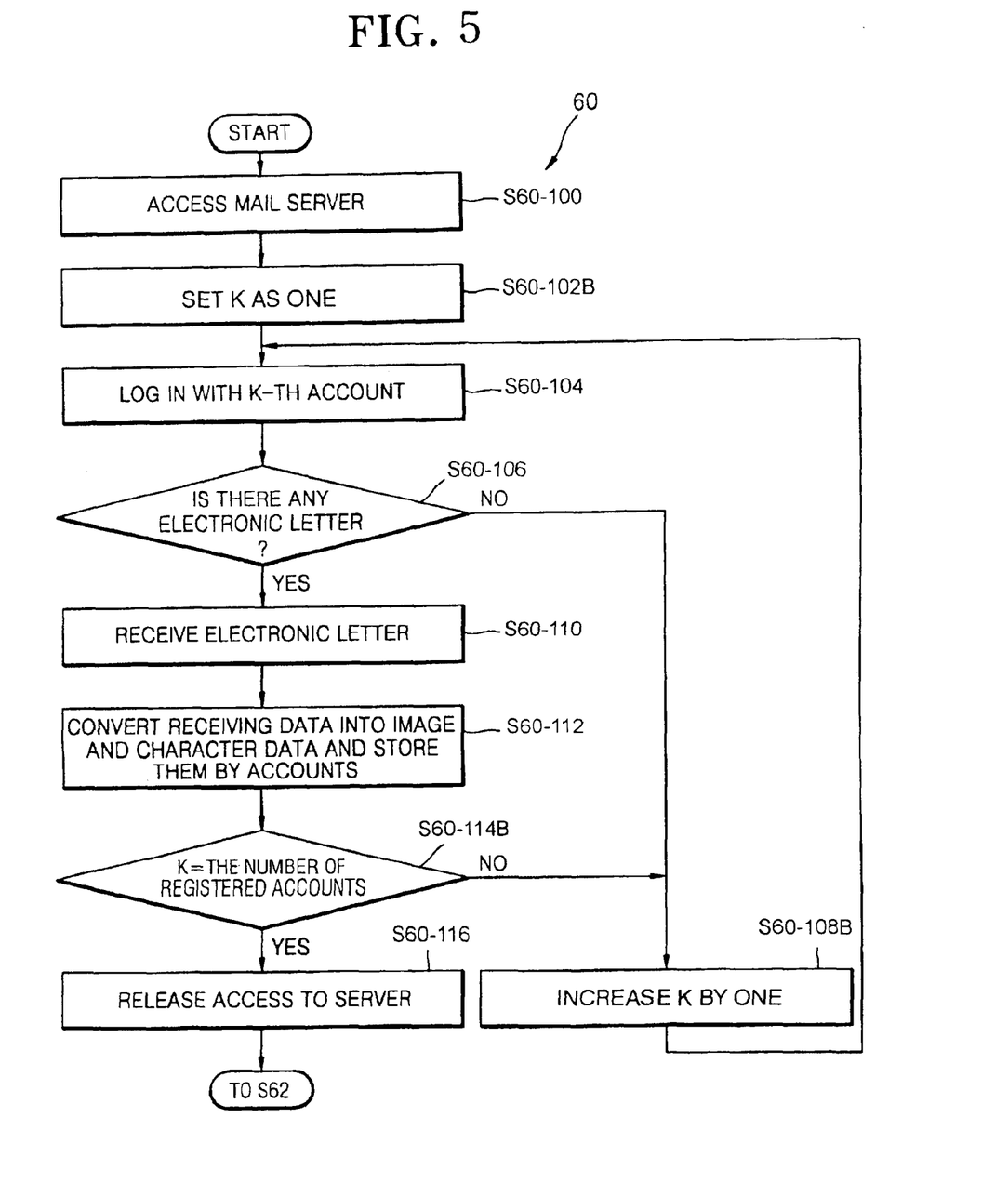

In another embodiment of the present invention, as seen in FIG. 5, K is set to 1 in step S102B. In step S60–114B, it is determined whether K is the number of registered accounts. In step S60–108B, K is increased by one.

Meanwhile, after the step S60, it is continuously determined whether an authorized user requests to view letters addressed to oneself in the steps S62 through S66. In these steps S62 through S66, the controller 14 determines whether a display requesting signal is input from the user interface unit 18. The steps S62 through S66 will be described in detail below.

In the step S62, it is determined whether any user requests to view electronic letters addressed to himself or herself. If there is a user requesting to view electronic letters, the user interface unit 18 receives a password input by the user in the step S64. In the step S66, the user interface unit 18 determines whether the password input by the user is valid. If the password is not valid, the step S64 is performed to request the user input another password. However, if the password is valid, the user interface unit 18 determines the user as an authorized user and generates and outputs a display requesting signal to the controller 14 in the step S68. Accordingly, an unauthorized user cannot view or print electronic letters addressed to the accounts of authorized users.

If it is determined that an authorized user requests to view electronic letters addressed to himself or herself, that is, if the user interface unit 18 generates a display requesting signal, in the step S70, the controller 14 outputs information extracted from the image and character data stored in the letter storing unit 12 to the display unit 24, and the display unit 24 display the information received from the controller 14.

Thereafter, in the step S72, information selected by the authorized user from the displayed information is determined. For example, the authorized user views the information displayed through the display unit 24 and selects desired information using the user interface unit 18. Then, the user interface unit 18 outputs an account control signal corresponding to the information selected by the user to the controller 14.

After the step S72, in the steps S74 through S82, the controller selectively reads corresponding data among the image and character data stored in the letter storing unit 12 in response to the account control signal. More specifically, in the step S74, the controller 14 analyzes information contained in the account control signal to determine whether every letter addressed to the authorized user's account indicated by the information selected by the authorized user is to be printed. If it is determined that every letter is to be printed, in the step S76, the controller 14 read data corresponding to every letter addressed to the authorized user's account from the letter storing unit 12. However, if it is determined that every letter is not to be printed, in the step S78, the controller 14 reads the corresponding subject or subjects among the subjects of the letter or letters addressed to the authorized user's account indicated by the information selected by the authorized user from the letter storing unit 12 and outputs the read subject or subjects to the display unit 24, and the display unit 24 displays the subject or subjects to the authorized user. Thereafter, in the step S80, a subject or subjects selected by the authorized user from the displayed subject or subjects are determined. In other words, the authorized user selects the subjects of letters that he or she wants to print from the subjects displayed on the display unit 24 by manipulating the user interface unit 18, and the user interface unit 18 outputs an account control signal having information corresponding to the selected subjects to the controller 14. Thereafter, in the step S82, the controller 14 reads only image and character data corresponding to a letter or letters having the determined subject or subjects from the letter storing unit 12 of FIG. 1 or 2.

Instep S84A the letter or letters corresponding to the image and character data read by the controller in step S82 are printed.

Figure 6:
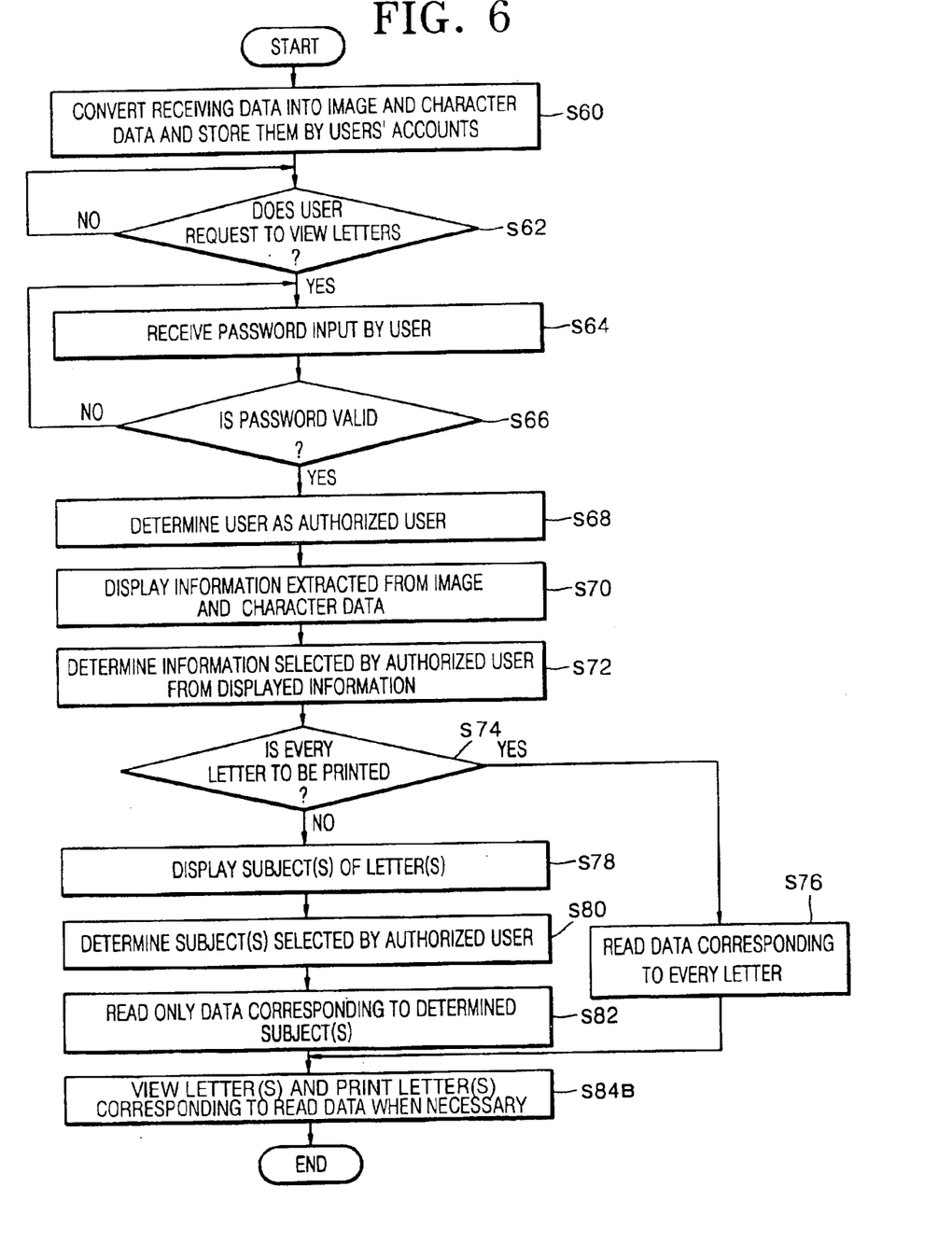
FIGS. 6 and 7 are flowcharts illustrating other embodiments of a multi-function method of receiving and printing an electronic letter according to the present invention.

In another embodiment, after the step S72, the authorized user is just allowed to view electronic letters corresponding to data read from the letter storing unit 12 through the display unit 24, instead of printing the letters. Accordingly, unlike an earlier apparatus, an electronic letter receiving and printing multi-function apparatus and method according to the present invention allows a user to print electronic letters when necessary as seen in step S84B of FIG. 6.

Figure 7:
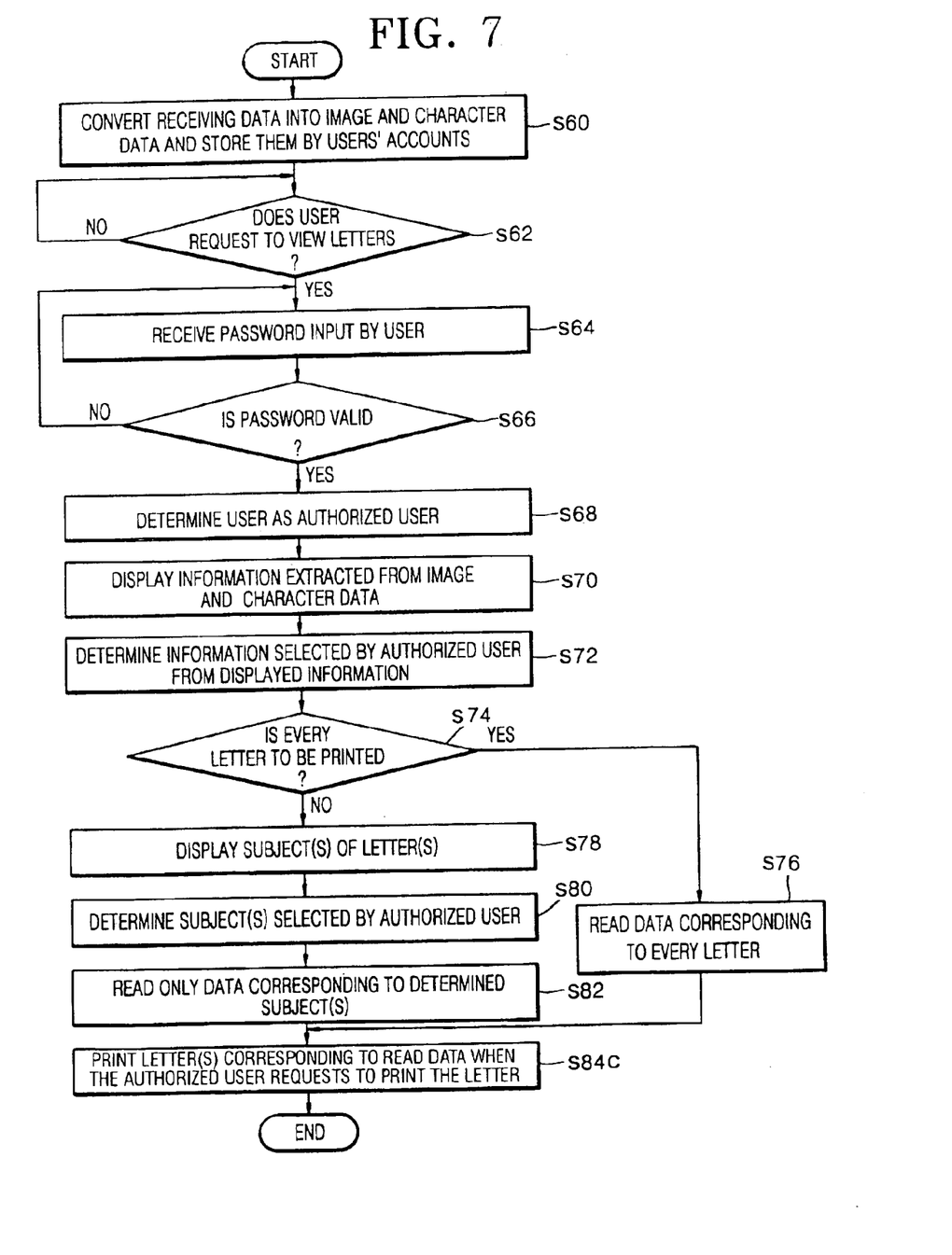

In still another embodiment, as seen in FIG. 7, and by going through the step S76 or S82, the authorized user can print an electronic letter corresponding to the data read from the letter storing unit 12 through the printer 16 in step S84C. In other words, an electronic letter receiving and printing multi-function apparatus and method according to the present invention can further provide the step S84C of printing an electronic letter corresponding to the data read from the letter storing unit 12 when the authorized user request to print the letter.

As described above, an electronic letter receiving and printing multi-function apparatus and method according to the present invention allows only an authorized user among a plurality of users to view or print a certain electronic letter, instead of indiscriminately printing all received electronic letters like a usual facsimile, so that electronic letters can be conveniently managed, and their security can be preserved. Since an electronic letter can be selectively printed only when necessary, waste of printing paper can be prevented. In addition, electronic letters can be stored using a built-in memory within a personal computer without a separate memory so that the manufacturing cost can be reduced.

What is claimed is:

1. An apparatus, comprising:
    an electronic letter receiver for converting received data corresponding to a letter received from a mail server into image and character data and outputting the image and character data, said electronic letter receiver receiving each letter from a plurality of users transferred by electronic mail to the mail server, the mail server having a unique address on a network and performing a mail service function;
    a letter storing unit accommodating sorting and storing of the image and character data by the account of users;
    a display unit for displaying information extracted from the image and character data;
    a user interface unit outputting a display requesting signal when an authorized user requests to view a letter addressed to the authorized user and outputting an account control signal having information selected by the authorized user from the displayed information;
    a controller storing the image and character data received from the electronic letter receiver in the letter storing unit, outputting the stored image and character data to the display unit in response to the display requesting signal, reading image and character data selected from among the stored image and character data based on the account control signal, from the letter storing unit, and outputting the read image and character data together with a printing control signal; and a printer for printing a letter corresponding to the image and character data selectively read by said controller, in response to the printing control signal, said letter storing unit being divided into a plurality of areas accommodating image and character data corresponding to an electronic letter addressed to a certain user being stored at an area assigned to the user.

2. The apparatus of claim 1, said letter storing unit included within a personal computer.

3. The apparatus of claim 1, said user interface unit outputting said display requesting signal and said account control signal in response to a valid password inputted by a user.

4. The apparatus of claim 1, further comprising a memory storing a system program instructing said controller.

5. The apparatus of claim 1, said electronic letter receiver converting received data corresponding to the letter under the control of the controller.

6. The apparatus of claim 1, said display unit displaying information extracted from the image and character data received from said controller to a user having the authority to view the information.

7. The apparatus of claim 1, said interface unit selected from the group consisting of a keypad and a mouse accommodating the display requesting signal to be generated only when authorized users inputs a valid password by manipulating the keys of the keypad or the mouse.

8. The apparatus of claim 1, further comprising a computer interface connecting a personal computer with said controller, said personal computer comprising said letter storing unit.

9. The apparatus of claim 1, said printer automatically printing a letter corresponding to the image and character data selectively read by said controller, in response to the printing control signal.

10. A method, comprising the steps of:

automatically connecting to a mail server without user input and automatically converting received data corresponding to each letter received from a server into image and character data, each letter transferred by electronic mail to the server from a plurality of users, the server having a unique address on a network and performing a mail service function, and sorting and storing the image and character data by an account of the user;

continuously determining whether an authorized user requests to view letters addressed to the authorized user;

displaying information extracted from the stored image and character data when the authorized user requests to view said letters addressed to the authorized user;

determining information selected by the authorized user from the displayed information;

reading image and character data corresponding to the selected information among the stored image and character data; and printing the letters corresponding to the image and character data read by said step of reading image and character data.

11. The method of claim 10, further comprising the step of printing a letter corresponding to the data read in said step of reading image and character data when the authorized user requests to print the letter.

12. The method of claim 10, said step of sorting and storing the image and character data by the account of a user being stored in a personal computer.

13. The method of claim 10, said steps being implemented by a program stored in a memory.

14. The method of claim 10, further comprising the step of viewing the letters and printing a letter corresponding to the data read in said step of reading image and character data when the authorized user requests to print the letter.

15. An apparatus, comprising:

an electronic letter receiver for converting received data corresponding to a letter received from a mail server into image and character data and outputting the image and character data, said electronic letter receiver receiving each letter from a plurality of users transferred by electronic mail to the mail server, the mail server having a unique address on a network and performing a mail service function;

a letter storing unit accommodating sorting and storing of the image and character data by the account of users;

a display unit for displaying information extracted from the image and character data;

a user interface unit outputting a display requesting signal when an authorized user requests to view a letter addressed to the authorized user and outputting an account control signal having information selected by the authorized user from the displayed information;

a controller storing the image and character data received from the electronic letter receiver in the letter storing unit, outputting the stored image and character data to the display unit in response to the display requesting signal, reading image and character data selected from among the stored image and character data based on the account control signal, from the letter storing unit, and outputting the read image and character data together with a printing control signal; and a printer for printing a letter corresponding to the image and character data selectively read by said controller, in response to the printing control signal, the displayed information including the number of the accounts of the users, the number of letters addressed to each account and the subjects of the letters, and the information selected by the authorized user being an account number and the subjects of the letters.

16. An apparatus, comprising:

an electronic letter receiver for converting received data corresponding to a letter received from a mail server into image and character data and outputting the image and character data, said electronic letter receiver receiving each letter from a plurality of users transferred by electronic mail to the mail server, the mail server having a unique address on a network and performing a mail service function;

a letter storing unit accommodating sorting and storing of the image and character data by the account of users;

a display unit for displaying information extracted from the image and character data;

a user interface unit outputting a display requesting signal when an authorized user requests to view a letter addressed to the authorized user and outputting an account control signal having information selected by the authorized user from the displayed information;

a controller storing the image and character data received from the electronic letter receiver in the letter storing unit, outputting the stored image and character data to the display unit in response to the display requesting signal, reading image and character data selected from among the stored image and character data based on the account control signal, from the letter storing unit, and outputting the read image and character data together with a printing control signal;

a printer for printing a letter corresponding to the image and character data selectively read by said controller in response to the printing control signal; and a memory storing a system program instructing said controller, with said memory being a flash memory.

17. An apparatus, comprising:

an electronic letter receiver for converting received data corresponding to a letter received from a mail server into image and character data and outputting the image and character data, said electronic letter receiver receiving each letter from a plurality of users transferred by electronic mail to the mail server, the mail server having a unique address on a network and performing a mail service function;

a letter storing unit accommodating sorting and storing of the image and character data by the account of users;

a display unit for displaying information extracted from the image and character data;

a user interface unit outputting a display requesting signal when an authorized user requests to view a letter addressed to the authorized user and outputting an account control signal having information selected by the authorized user from the displayed information;

a controller storing the image and character data received from the electronic letter receiver in the letter storing unit, outputting the stored image and character data to the display unit in response to the display requesting signal, reading image and character data selected from among the stored image and character data based on the account control signal, from the letter storing unit, and outputting the read image and character data together with a printing control signal;

a printer for printing a letter corresponding to the image and character data selectively read by said controller, in response to the printing control signal; and a memory storing a system program instructing said controller, with said memory being an erasable programmable read only memory.

18. An apparatus, comprising:

an electronic letter receiver for converting received data corresponding to a letter received from a mail server into image and character data and outputting the image and character data, said electronic letter receiver receiving each letter from a plurality of users transferred by electronic mail to the mail server, the mail server having a unique address on a network and performing a mail service function;

a letter storing unit accommodating sorting and storing of the image and character data by the account of users;

a display unit for displaying information extracted from the image and character data;

a user interface unit outputting a display requesting signal when an authorized user requests to view a letter addressed to the authorized user and outputting an account control signal having information selected by the authorized user from the displayed information;

a controller storing the image and character data received from the electronic letter receiver in the letter storing unit, outputting the stored image and character data to the display unit in response to the display requesting signal, reading image and character data selected from among the stored image and character data based on the account control signal, from the letter storing unit, and outputting the read image and character data together with a printing control signal; and a printer for printing a letter corresponding to the image and character data selectively read by said controller, in response to the printing control signal, with said electronic letter receiver being a modem performing modulation and demodulation for transmitting and receiving signals over a communication line.

19. An apparatus, comprising:

an electronic letter receiver for converting received data corresponding to a letter received from a mail server into image and character data and outputting the image and character data, said electronic letter receiver receiving each letter from a plurality of users transferred by electronic mail to the mail server, the mail server having a unique address on a network and performing a mail service function;

a letter storing unit accommodating sorting and storing of the image and character data by the account of users;

a display unit for displaying information extracted from the image and character data;

a user interface unit outputting a display requesting signal when an authorized user requests to view a letter addressed to the authorized user and outputting an account control signal having information selected by the authorized user from the displayed information;

a controller storing the image and character data received from the electronic letter receiver in the letter storing unit, outputting the stored image and character data to the display unit in response to the display requesting signal, reading image and character data selected from among the stored image and character data based on the account control signal, from the letter storing unit, and outputting the read image and character data together with a printing control signal; and a printer for printing a letter corresponding to the image and character data selectively read by said controller, in response to the printing control signal, said letter storing unit including backup function for accommodating a power failure.

20. An apparatus, comprising:

an electronic letter receiver for converting received data corresponding to a letter received from a mail server into image and character data and outputting the image and character data, said electronic letter receiver receiving each letter from a plurality of users transferred by electronic mail to the mail server, the mail server having a unique address on a network and performing a mail service function;

a letter storing unit accommodating sorting and storing of the image and character data by the account of users;

a display unit for displaying information extracted from the image and character data;

a user interface unit outputting a display requesting signal when an authorized user requests to view a letter addressed to the authorized user and outputting an account control signal having information selected by the authorized user from the displayed information;

a controller storing the image and character data received from the electronic letter receiver in the letter storing unit, outputting the stored image and character data to the display unit in response to the display requesting signal, reading image and character data selected from among the stored image and character data based on the account control signal, from the letter storing unit, and outputting the read image and character data together with a printing control signal;

a printer for printing a letter corresponding to the image and character data selectively read by said controller in response to the printing control signal; and a scanner accommodating facsimile transmission of image data processed by said scanner under the control of said controller.

21. An apparatus, comprising:

an electronic letter receiver for converting received data corresponding to a letter received from a mail server into image and character data and outputting the image and character data, said electronic letter receiver receiving each letter from a plurality of users transferred by electronic mail to the mail server, the mail server having a unique address on a network and performing a mail service function;

a letter storing unit accommodating sorting and storing of the image and character data by the account of users;

a display unit for displaying information extracted from the image and character data;

a user interface unit outputting a display requesting signal when an authorized user requests to view a letter addressed to the authorized user and outputting an account control signal having information selected by the authorized user from the displayed information;

a controller storing the image and character data received from the electronic letter receiver in the letter storing unit, outputting the stored image and character data to the display unit in response to the display requesting signal, reading image and character data selected from among the stored image and character data based on the account control signal, from the letter storing unit, and outputting the read image and character data together with a printing control signal;

a printer for printing a letter corresponding to the image and character data selectively read by said controller, in response to the printing control signal; and a computer interface connecting a personal computer with said controller, said personal computer comprising said letter storing unit, said computer interface unit selected from the group consisting of parallel port, and universal serial bus.

22. An apparatus, comprising:

an electronic letter receiver for converting received data corresponding to a letter received from a mail server into image and character data and outputting the image and character data, said electronic letter receiver receiving each letter from a plurality of users transferred by electronic mail to the mail server, the mail server having a unique address on a network and performing a mail service function;

a letter storing unit accommodating sorting and storing of the image and character data by the account of users;

a display unit for displaying information extracted from the image and character data;

a user interface unit outputting a display requesting signal when an authorized user requests to view a letter addressed to the authorized user and outputting an account control signal having information selected by the authorized user from the displayed information;

a controller storing the image and character data received from the electronic letter receiver in the letter storing unit, outputting the stored image and character data to the display unit in response to the display requesting signal, reading image and character data selected from among the stored image and character data based on the account control signal, from the letter storing unit, and outputting the read image and character data together with a printing control signal;

a printer for printing a letter corresponding to the image and character data selectively read by said controller, in response to the printing control signal; and a computer interface connecting a personal computer with said controller, said personal computer comprising said letter storing unit, said computer interface receiving data scanned by a scanner and transmitting the data from the scanner to said letter storing unit of the personal computer.

23. A method, comprising the steps of:

converting received data corresponding to each letter received from a server into image and character data, each letter transferred by electronic mail to the server from a plurality of users, the server having a unique address on a network and performing a mail service function, and sorting and storing the image and character data by an account of the user;

continuously determining whether an authorized user requests to view letters addressed to the authorized user;

displaying information extracted from the stored image and character data when the authorized user requests to view said letters addressed to the authorized user;

determining information selected by the authorized user from the displayed information; and reading image and character data corresponding to the selected information among the stored image and character data, the step of converting received data and sorting and storing the image and character data, comprising the steps of:

accessing the server, setting K as the number of registered accounts, K being within the range of $1 \leq K \leq$ the number of accounts, the number of registered accounts being a portion or all of the number of accounts;

logging onto the accessed server with a K-th account;

determining whether there is any letter addressed to the K-th account;

decreasing K by one when there is no letter addressed to the K-th account and going back to said step of logging into the accessed server, receiving a letter from the server if there is at least one letter addressed to the K-th account;

converting received data corresponding to the received letter into image and character data;

sorting and storing the image and character data by the accounts of the users;

determining whether K is equal to one and going back to said step of decreasing K by one when K is not equal to one; and releasing the access to the server when K is equal to one.

24. A method, comprising the steps of:
converting received data corresponding to each letter received from a server into image and character data, each letter transferred by electronic mail to the server from a plurality of users, the server having a unique address on a network and performing a mail service function, and sorting and storing the image and character data by an account of the user;
continuously determining whether an authorized user requests to view letters addressed to the authorized user;
displaying information extracted from the stored image and character data when the authorized user requests to view said letters addressed to the authorized user;
determining information selected by the authorized user from the displayed information; and
reading image and character data corresponding to the selected information among the stored image and character data,
said step of continuously determining whether an authorized user request to view letters addressed to the authorized user, comprising the steps of:
continuously determining whether a user requests to view letters;
receiving a password input by the user when it is determined the user requests to view letters;
determining whether the password is valid and going back to said step of receiving a password input by the user when the password is not valid; and
determining the user as an authorized user when the password is valid.

25. A method, comprising the steps of:
converting received data corresponding to each letter received from a server into image and character data, each letter transferred by electronic mail to the server from a plurality of users, the server having a unique address on a network and performing a mail service function, and sorting and storing the image and character data by an account of the user;
continuously determining whether an authorized user requests to view letters addressed to the authorized user;
displaying information extracted from the stored image and character data when the authorized user requests to view said letters addressed to the authorized user;
determining information selected by the authorized user from the displayed information;
reading image and character data corresponding to the selected information among the stored image and character data; and
printing a letter corresponding to the data read in said step of reading image and character data when the authorized user requests to print the letter,
said step of reading image and character data comprising the steps of:
determining whether every letter addressed to the account of the authorized user indicated by the selected information is to be printed;
reading the stored image and character data corresponding to every letter when it is determined that the every letter is to be printed and proceeding to said step of printing a letter corresponding to the data read;
displaying the subject of letters addressed to an account indicated by the selected information when it is determined that every letter is not to be printed;
determining at least one subject selected by the authorized user from the displayed subjects; and
reading only the stored image and character data corresponding to a letter having the determined subject.

26. A method, comprising the steps of:
converting received data corresponding to each letter received from a server into image and character data, each letter transferred by electronic mail to the server from a plurality of users, the server having a unique address on a network and performing a mail service function, and sorting and storing the image and character data by an account of the user;
continuously determining whether an authorized user requests to view letters addressed to the authorized user;
displaying information extracted from the stored image and character data when the authorized user requests to view said letters addressed to the authorized user;
determining information selected by the authorized user from the displayed information; and
reading image and character data corresponding to the selected information among the stored image and character data,
the step of converting received data and sorting and storing the image and character data, comprising the steps of:
accessing the server;
setting K as one;
logging onto the accessed server with a K-th account;
determining whether there is any letter addressed to the K-th account;
increasing K by one when there is no letter addressed to the K-th account and going back to said step of logging into the accessed server;
receiving a letter from the server if there is at least one letter addressed to the K-th account;
converting received data corresponding to the received letter into image and character data;
sorting and storing the image and character data by the accounts of the users;
determining whether K is equal to the number of registered accounts and going back to said step of increasing K by one when K is not equal to the number of registered accounts; and
releasing the access to the server when K is equal to the number of registered accounts.

27. A method, comprising the steps of:
converting received data corresponding to each letter received from a server into image and character data, each letter transferred by electronic mail to the server from a plurality of users, the server having a unique address on a network and performing a mail service function, and sorting and storing the image and character data by an account of the user;
continuously determining whether an authorized user requests to view letters addressed to the authorized user;
displaying information extracted from the stored image and character data when the authorized user requests to view said letters addressed to the authorized user;
determining information selected by the authorized user from the displayed information;
reading image and character data corresponding to the selected information among the stored image and character data; and printing the letters corresponding to the image and character data read by said step of reading image and character data.

with said letter being stored in a storing unit, said letter storing unit being divided into a plurality of areas accommodating image and character data corresponding to an electronic letter addressed to a certain user being stored at an area assigned to the user, and after said step of determining information selected, the authorized user is only allowed to view electronic letters corresponding to data read from the letter storing unit instead of printing the letters.

28. An apparatus, comprising:

an electronic letter receiver for converting received data corresponding to a letter received from a mail server into image and character data and outputting the image and character data, said electronic letter receiver receiving each letter from a plurality of users transferred by electronic mail to the mail server, the mail server having a unique address on a network and performing a mail service function;

a letter storing unit accommodating sorting and storing of the image and character data by the account of users;

a display unit for displaying information extracted from the image and character data;

a user interface unit outputting a display requesting signal when an authorized user requests to view a letter addressed to the authorized user and outputting an account control signal having information selected by the authorized user from the displayed information;

a controller storing the image and character data received from the electronic letter receiver in the letter storing unit, outputting the stored image and character data to the display unit in response to the display requesting signal, reading image and character data selected from among the stored image and character data based on the account control signal, from the letter storing unit, and outputting the read image and character data together with a printing control signal; and a printer for printing a letter corresponding to the image and character data selectively read by said controller, in response to the printing control signal, with said electronic letter receiver being automatically connecting to said mail server without user input, accommodating said controller accessing said mail server by transmitting access signals for checking whether the mall server is on, whether the mail server can provide a mail service function via said electronic letter receiver, with said controller classifying said electronic mail of users according to the previously input mail accounts.

* * * * *